United States Patent
Smith et al.

(10) Patent No.: US 6,651,166 B1
(45) Date of Patent: Nov. 18, 2003

(54) SENDER DRIVEN CERTIFICATION ENROLLMENT SYSTEM

(75) Inventors: Jeffrey C. Smith, Menlo Park, CA (US); Jean-Christophe Bandini, Cupertino, CA (US)

(73) Assignee: Tumbleweed Software Corp., Redwood City, CA (US)

( * ) Notice: Subject to any disclaimer, the term of this patent is extended or adjusted under 35 U.S.C. 154(b) by 0 days.

(21) Appl. No.: 09/057,966

(22) Filed: Apr. 9, 1998

(51) Int. Cl.[7] .................................................. H04L 9/00
(52) U.S. Cl. ........................ 713/150; 380/277; 380/285
(58) Field of Search ................................ 380/277, 285; 713/150

(56) References Cited

U.S. PATENT DOCUMENTS

| | | |
|---|---|---|
| 4,289,930 A | 9/1981 | Connolly et al. |
| 4,532,588 A | 7/1985 | Foster ......................... 364/200 |
| 4,713,780 A | 12/1987 | Schultz et al. ............... 364/514 |
| 4,754,428 A | 6/1988 | Schultz et al. ............... 364/900 |
| 4,837,798 A | 6/1989 | Cohen et al. .................. 379/88 |
| 4,868,877 A * | 9/1989 | Fischer ......................... 380/25 |
| 5,008,814 A | 4/1991 | Mathur ........................ 364/200 |
| 5,105,184 A | 4/1992 | Pirani et al. |
| 5,210,824 A | 5/1993 | Putz et al. .................... 395/145 |
| 5,247,661 A | 9/1993 | Hager et al. |
| 5,276,869 A | 1/1994 | Forrest et al. |
| 5,283,887 A | 2/1994 | Zachery |
| 5,293,250 A | 3/1994 | Okumura et al. ............ 358/402 |
| 5,341,426 A * | 8/1994 | Barney et al. ................. 380/21 |
| 5,355,472 A | 10/1994 | Lewis |
| 5,367,621 A | 11/1994 | Cohen et al. |
| 5,379,374 A | 1/1995 | Ishizaki et al. |
| 5,404,231 A | 4/1995 | Bloomfield .................. 358/400 |
| 5,406,557 A | 4/1995 | Baudoin ........................ 370/61 |
| 5,416,842 A | 5/1995 | Aziz ............................. 380/30 |
| 5,418,908 A | 5/1995 | Keller et al. |
| 5,424,724 A | 6/1995 | Williams et al. ......... 340/825.05 |
| 5,479,411 A | 12/1995 | Klein |
| 5,483,466 A | 1/1996 | Kawahara et al. |
| 5,495,610 A | 2/1996 | Shing et al. .................. 395/600 |
| 5,513,126 A | 4/1996 | Harkins et al. ........... 364/514 A |
| 5,513,323 A | 4/1996 | Williams et al. |
| 5,530,852 A | 6/1996 | Meske, Jr. et al. |
| 5,544,320 A | 8/1996 | Konrad |
| 5,550,984 A | 8/1996 | Gelb ....................... 395/200.17 |
| 5,572,643 A | 11/1996 | Judson |
| 5,608,874 A | 3/1997 | Ogawa et al. ........... 395/200.15 |
| 5,675,507 A | 10/1997 | Bobo, II .................. 364/514 R |

(List continued on next page.)

FOREIGN PATENT DOCUMENTS

GB        2318486 A   *   4/1998  ............. H04L/9/30

OTHER PUBLICATIONS

Self–Certified Public Keys EuroCrypt'91.*
Hofrichter, et al. "The BERKOM Multimedia–Mail Teleservice," Proceedings of the Fourth Workshop Future Trends of Distributed Computing Systems, Sep. 22–24, 1993, IEEE Computer Society Press (dS00611–619).

(List continued on next page.)

*Primary Examiner*—Gail Hayes
*Assistant Examiner*—James Seal
(74) *Attorney, Agent, or Firm*—Skadden, Arps, Slate, Meagher & Flom LLP

(57) ABSTRACT

A sender driven certificate enrollment system and methods of its use are provided, in which a sender controls the generation of a digital certificate that is used to encrypt and send a document to a recipient in a secure manner. The sender compares previously stored recipient information to gathered information from the recipient. If the information matches, the sender transfers key generation software to the recipient, which produces the digital certificate, comprising a public and private key pair. The sender can then use the public key to encrypt and send the document to the recipient, wherein the recipient can use the matching private key to decrypt the document.

41 Claims, 10 Drawing Sheets

US 6,651,166 B1
Page 2

U.S. PATENT DOCUMENTS

| | | | |
|---|---|---|---|
| 5,677,955 A | 10/1997 | Doggett et al. | |
| 5,706,442 A | 1/1998 | Anderson et al. | 395/227 |
| 5,708,780 A | 1/1998 | Levergood et al. | 395/200.12 |
| 5,710,883 A | 1/1998 | Hong et al. | 395/200.17 |
| 5,727,156 A | 3/1998 | Herr-Hoyman et al. | 395/200.49 |
| 5,751,956 A | 5/1998 | Kirsch | 395/200.33 |
| 5,758,343 A | 5/1998 | Vigil et al. | 707/10 |
| 5,764,906 A | 6/1998 | Edelstein et al. | 395/200.49 |
| 5,768,528 A | 6/1998 | Stumm | |
| 5,778,372 A | 7/1998 | Cordell et al. | 707/100 |
| 5,781,901 A | 7/1998 | Kuzma | 707/10 |
| 5,790,793 A | 8/1998 | Higley | 395/200.48 |
| 5,793,972 A | 8/1998 | Shane | 395/200.49 |
| 5,805,719 A | 9/1998 | Pare, Jr. et al. | 382/115 |
| 5,812,668 A * | 9/1998 | Weber | 380/24 |
| 5,812,776 A | 9/1998 | Gifford | 395/200.47 |
| 5,815,657 A * | 9/1998 | Williams et al. | 713/200 |
| 5,825,300 A * | 10/1998 | Bathrick et al. | 340/825.33 |
| 5,845,084 A | 12/1998 | Cordell et al. | 395/200.64 |
| 5,850,442 A | 12/1998 | Muftic | 380/21 |
| 5,855,020 A | 12/1998 | Kirsch | |
| 5,860,068 A | 1/1999 | Cook | 705/26 |
| 5,903,723 A | 5/1999 | Beck et al. | 395/200.3 |
| 5,982,898 A * | 11/1999 | Hsu et al. | 380/23 |
| 6,035,402 A * | 3/2000 | Vaeth et al. | 713/201 |
| 6,233,341 B1 * | 5/2001 | Riggins | 380/277 |
| 6,243,466 B1 * | 6/2001 | Young et al. | 380/28 |
| 6,424,718 B1 * | 7/2002 | Holloway | 380/277 |

OTHER PUBLICATIONS

"Information technology—Text and office systems—Distributed–office–applications model," International Standard, ISO/IEC 100031–1, First edition Aug. 1, 1991 (dS00786–863).

Baudoin, "The Sematech Electronic Mail System," Proceedings of the Digital Equipment Computer Users Society, U.S.A. Spring, 1989 (dS12031–12044).

Klensin, "Simple Mail Transfer Protocol," An InternetDraft, MCI, May 21, 1996 (dS11902–11970).

Borenstein, et al., "MIME (Multipurpose Internet Mail Extensions) Part One: Mechanism for Specifying Describing the Format of Internet Message Bodies," Network Working Group, RFC 1521, Sep. 1993 (dS01206–1279).

Moore, "MIME (Multipurpose Internet Mail Extensions) Part Two: Message Header Extensions for Non–ASCII Text," Network Working Group, RFC1522, Sep. 1993 (dS01196–1205).

Morris, "A Technical Overview of MIME, Multipurpose Internet Mail Extensions(s)," Web Developer's Journal Archives, Mar. 30, 1995 (dS077136–7143).

"comp.mail.mime FAQ (frequently asked questions list)", downloaded from http://www.cis.ohio–state.edu/text/faq/usenet/mailmime–faq/part1faq.html, Jun. 11, 1997 (dS07144–7155).

"comp.mail.mime frequently asked questions list (FAQ) (1/3)", downloaded from http://www.tu.chemnitz.de/–fri/mime/FAQ–1/html, Sep. 4, 1994 (dS07206–07221).

Grand, "MIME Overview," Revised Oct. 26, 1993, downloaded from http://www.mindspring.com/–mgrand/mime.html (dS07222–7234).

Connolly, "A Formalism for Internet Information References," a print out form http://www.w3.org/people/connolly/drafts.formalism.txt, Apr. 19, 1994 (dS07235–07243).

Minutes of the Notifications and Acknowledgements Requirements Working Group (Notary), Meeting at the 32$^{nd}$ IETF on Apr. 3 and Apr. 6, purported to be published 1995 (dS11800–11823).

Vaudreuil, "The Multipart/Report Content Type for the Reporting of Mail System Administrative Messages," Network Working Group, an Internet Draft, Sep. 21, 1995 (dS07244–07247).

Vaudreuil, "Enhance Mail System Status Codes," Network Working Group, an Internet Draft, Jun. 14, 1995 (dS07248–07265).

Moore, et al. "An Extensible Messager Format for Delivery Status Notifications," Network Working Group, an Internet Draft, Sep. 21, 1995 (dS07266–7300).

"ESIX System V Release 4, System Administrator's Guide," Prentice–Hall, Inc., Copyright 1991 UNIX System Laboratories, Inc. (dS11824–11842).

"ESIX Sytem V Release 4, User's Reference Manual," Prentice–Hall, Inc., Copyright 1991 UNIX System Laboratories, Inc. (dS11843–11872).

Docspace's Initial Disclosure of Prior Art, Case No. C–99–20177–JW, US District Court, Northern District for California, San Jose Division.

Moeller, et al. "The BERKOM multimedia–mail teleservice," Computer Communications, vol. 18, No. 2, Feb. 1995 (dS00757–771).

"Information technology—Text and office systems—Distributed–office–applications model–Part 2: Distinguished–object–reference and associated procedures," International Standard ISO/IEC 10031–2:199 (E) (dS00864–881).

Manros, "New Internet Mail Functionally for Delivery Status Notifications" Messaging Magazine, Jul./Aug. 1995 (dS00749–755).

Freed, et al. "Definition of the URL MIME External–Body Access–Type," Network Working Group, an Internet–Draft, Apr. 11, 1995 (dS01460–1464) [see also Freed, et al. "Definition of the URL MIME External–Body Access–Type," Network Working Group, RFC 2017, Oct. 1996 (dS02153–2157)].

Moore, "SMTP Service Extension for Delivery Status Notifications," Network Working Group, an Internet–draft, Sep. 21, 1995 (dS01549–1579).

Crocker, "Standard for the Format of Arpa Internet Text Messages," Aug. 13, 1982, Dept. of Electrical Engineering, University of Delaware (dS01580–1624).

Bradner, "The Internet Standards Process—Revision 3," Network Working Group, RFC 2026, Oct. 1996 (dS01625–1656).

Crispin, "Internet Message Access Protocol—Version 4," an Internet–draft. RFC 1730 (dS 01465–1467).

Borenstein, "MIME, Mechanism for Specifying and Describing the Format of Internet Message Bodies," Network Working Group, RFC 1341, Jun. 1992 (dS01468–1548).

Moore, "Representation of Non–ASCII Text in Internet Message Headers," Network Working Group, RFC 1342, Jun. 1992 (dS01444–1450).

Borenstein, "Implications of MIME for Internet Mail Gateways," Network Working Group, RFC 1344, Jun. 1992 (dS01451–1459).

"ESIX System V Release 4, System Administrators's Reference Manual," Prentice–Hall, Inc., Copyright 1991 UNIX System Laboratories, Inc. (dS11873–11901).

Braden, "Requirements for Internet Hosts—Application and Support," Network Working Group, RFC 1123, Oct. 1989 (dS02185–02273).

Berners–Lee, "Universal Resource Identifiers in WWW, A Unifying Syntax for the Expression of Names and Addresses of Objects on the Network as used in the World–Wide Web," Network Working Group, RFC 1630, Jun. 1994 (dS01954–1978).

Myers, et al, Post Office Protocol—Version 3, Network Working Group, RFC 1725, Nov. 1994 (dS02135–2150).

Sollins, et al, "Functional Requirements for Uniform Resource Names," Network Working Group, RFC 1737, Dec. 1994 (dS01979–1985).

Berners–Lee, et al, "Uniform Resource Locators (URL)," Network Working Group, RFC 1738, Dec. 1994 (dS01986–2007).

Berners–Lee et al., "Hypertext Markup Language—2.0," Network Working Group, RFC 1866, Nov. 1995 (dS02008–2074).

Gay, et al, "Conception of a Multimedia Electronic Mail Based on Standards," Proceedings of the Fourth Workshop on Future Trends of Distributed Computing Systems, Sep. 22–24, 1993 (dS99603–610).

Postel, et al, "An Experimental Multimedia Mail System," University of Souhtern California, Marina del Rey (dS 00633–651).

Sakata, "A Distributed Interoffice Mail System," IEEE, Oct. 1985 (dS00652–662).

Poggio, et al. "CCWS: A Computer–Based, Multimedia Information System," IEEE, Oct. 1985 (dS00663–674).

Reynolds, et al. "The DARPA Experimental Multimedia Mail System," IEEE, Oct. 1985 (dS00687–694).

Reinhardt, "Smarter E–Mail Is Coming," Byte, Mar. 1993 (dS00695–705).

Borenstein, et al, "a Multimedia Message System for Andrew," USENIX Winter Conference, Feb. 9–12, 1988 (dS00706–711).

Sherman, et al. "Allocation of User–Interface Resources in the Andrew Toolkit," Intl Conference on Multimedia Information Systems '91 (dS11971–11983).

"Frontiers in Computer Communications Technology," Proceedings of the ACM SIGCOMM '87 Workshop, Stowe, Vermont, Aug. 11–13, 1987 (dS11984–11999).

Streitz,

"The Andrew Messages System," downloaded from http://www.cs.cmu.edu/afs/cs.cmu.edu/project/atk–ftp/web/am-s.html (dS12017–12018).

"Facts on File, What is Andrew?," downloaded from http://www.cs.cmu.edu:80/afs/cs.cmu.edu/project/atk–ftp/web/faxonfile.html (dS12019–12026).

"Welcome to Andrew Consortium," downloaded form http://www.cs.cmu.edu:80/afs/cs.cmu.edu/project/atk–ftp/web/andrew–home.html (dS12017–12030).

Baker, "Hypertext Browsing on the Internet," UNIX Review, Sep. 1994 (dS00725–732).

Dern, "Corporate, research, educational, governmental, and other real–world uses," BYTE Magazine, Feb. 1992 (dS01061–1067).

Savetz, "Magazines Without Paper," BYTE Magazine, Sep. 1993 (dS01068–1069).

Vaughan–Nichols, "Companies are increasingly turning to the World Wide Web to spread the work on their products and services," BYTE Magazine, Nov. 1994 (dS01070–1071).

Singleton, "On the Internet, no one needs to know how small your business is," BYTE Magazine, Jan. 1995 (dS01072–1077).

Vacca, "Mosaic is more than a GUI for navigating the Internet: it's also a tool for doing business on the World Wide Web," BYTE Magazine, Jan. 1995 (dS01078–1084).

Smith, "Netscape Communications rebuilds the World Wide Web," BYTE Magazine, Jan. 1995 (dS01085–1088).

Smith, "Making the Internet Connection," BYTE Magazine, Jan. 1995 (dS01089–1091).

Vaughan–Nichols, "Internet Publishing Tools Proliferate," BYTE Magazine, Mar. 1995 (dS01092–1093).

Friesenhahn, "Many organizations want to set up their own World Wide Web Server. Here's why–and how to do it," BYTE Magazine, Apr. 1995 (dS01094–1100).

Jones, "Caught in the World Wide Web: MIT Moves Computer Documentation Online," 1994 ACM (dS1101–1103).

Baker, "Mosaic–Surfing at Home and Abroad," 1994 ACM (dS01104–1108).

Better, et al. "Mosaic, HTML, and the World Wide Web," Appeared in IEEE Computer, vol. 27, No. 10, Oct. 1994 (dS01109–1135).

"Using Mosaic Xwindows," University of Cambridge Statistical Laboratory, Internet Publication, Jul. 1994, downloaded from http://www.statslab.cam.ac.uk.index.html (dS01136–1138).

"New Features in Mosaic 2.0," Internet Publication, Dec. 1994, downloaded from http://www.issi.com/common/new-features–Mosaic2.0/html (dS01139–1141).

"World Wide Web Frequently Asked Questions," downloaded from htt://sunsite.unc.edu/boutell/faq/www_faq.html (dS01142–1170).

MhonArc Home Page, updated Nov. 17, 1994, Published by Earl Hood, CONVEX Computer Corporation (dS01171–1178).

Liu, et al., "Managing Internet Information Services," World Wide Web, Gopher, FTP, and more, O'Reilly & Associates, Inc. (dS01280–1284).

December, "Tricks of the Internet Gurus" Copyright 1994 by Sams Publishing (dS01285–1294).

December, et al., "Everything You Need to Master the Web," Copyright 1994 by Sams Publishing (dS01295–1311).

Berners–Lee, et al. "Hypertext Markup Language (HTML), A Representation of Textual Information and MetalInformation for Retrieval and Interchange," an Internet Draft, IIIR Working Group, Jun. 1993 (dS–01312–1359).

Reichard, "Leveraging E–Mail," PC Magazine, May 16, 1995 (dS01360–1362).

Kent, et al., "Browsing Electronic Mail: Experiences Interfacing a Mail System to a DBMS," Proceedings of the $14^{th}$ VLDB Conference, Los Angeles, California 1988 (dS01895–1907).

Donahue, et al., "Walnut: Storing Electronic Mail in a Database," Xerox Report No. CSL–85–9 (dS01908–1933).

Van Name, et al., "Win95 plays to bottom line of TCP/IP" PC Week, v12, n35, pN6(1), Sep. 4, 1995 (dS02274–2277).

Hui, et al., "A Multimedia Electronic Mail System on a Heterogeneous Environment," IEEE Tencon '93, Beijing (dS02278–02281).

DIALOG(R) File 621:IAC New Prod.Annou. "Novell Announces *Softsolutions* 4.1", PR Newswire, May 9, 1995 (dS02282–2283).

"Lan–Aces, Inc. Announces Expanded Capabilities to Office–Logic Clerk Application," PR Newswire, May 6, 1995 (dS02284).

Soper, DIALOG(R) File 256: SoftBase: Reviews, Companies&Prods., "Working with . . . AT&T Easylink," PC Today, v9 n5 p62, May 1995 (dS02285–2286).

* cited by examiner

SENDER DRIVEN CERTIFICATION ENROLLMENT SYSTEM

FIELD OF THE INVENTION

The invention relates to the field of electronic document encryption. More particularly, the invention relates to techniques for the secure delivery of electronic documents to remote recipients.

BACKGROUND OF THE INVENTION

The development of computerized information sources, such as those provided through the Internet or other on-line sources, has led to a proliferation of electronically available information. The desired or required security for the secure distribution of information and documents across networks has led to a variety of architectures and techniques to protect this information.

Encryption is a basic technique to scramble information or documents to prevent unsolicited access to that information.

FIG. 1 is a block diagram of secret key encryption 10a, wherein a document 12 is encrypted, or scrambled, with a secret key 14, producing an encrypted document 20. The encrypted document 20 can then be transferred to a recipient. Secret key encryption, sometimes referred to as symmetric key cryptography, employs a technique of scrambling information to prevent unsolicited access, using a unique, secret key 14.

FIG. 2 is a block diagram of secret key decryption 10b, wherein the same, unique secret key 14 is required to unscramble 22 the encrypted document 20, to reproduce a copy of the original document 12. Without access to the secret key 14, an encrypted document 20 remains secure from tampering.

One potential issue with secret key encryption 10a and 10b is the challenge of distributing the secret key 14 securely. For example, suppose a sender uses secret key encryption to encrypt a document 12, and then sends a recipient the encrypted document 20. The recipient needs the secret key 14 to decrypt 22 the encrypted document 20. If the secret key 22 is sent over a non-secure channel, then the integrity of the security is compromised. For most applications, telephone or fax provides a secure enough means of delivering secret keys 14, while the encrypted document 20 can be delivered over the internet using Posta™. In some instances, however, senders and recipients require a more robust or convenient means of distributing a secret key 14.

Public key encryption facilitates a more robust, and typically a more convenient means, of delivering information securely. With public key encryption, each recipient owns a pair of keys, called a public key 32 and a private key 40. The key pair's owner (the recipient) publishes the public key 32, and keeps the private key 40 a secret.

FIG. 3 is a block diagram of public key encryption 30a, wherein a document 12 is encrypted, or scrambled 34, with a public key 32, producing an encrypted document 36. To send information to a recipient, a sender uses the published public key 32 of the intended recipient to encrypt 34 the information, and then the recipient uses their own private key 40 to decrypt the information. Hence, the private key 40 (which is necessary to decrypt the information) is not distributed. FIG. 4 is a block diagram of private key decryption 30b, wherein the private key 40 is required to unscramble 38 the encrypted document 36, to reproduce a copy of the original document 12. Without access to the private key 40, an encrypted document 36 remains secure from tampering.

Public key encryption 30a and 30b typically exploits a mathematical relationship between the public and private keys 32, 40, which allows a public key 32 to be published, without risking the derivation of the private key 40 from the published public key 32.

Public key encryption algorithms are typically complex, and hence may be too time consuming to be of practical use for many users. Secret key encryption 10a, 10b is typically much faster than public key encryption 30a, 30b, but requires the transmission the secret key 14 from the sender to the recipient.

In a digital envelope system, a user encrypts a document 12 with a secret key 14, and then encrypts the secret key 14 with the public key 32 of the intended recipient. The recipient of the encrypted document 20 then uses their private key 40 to decrypt the secret key 14, and then uses the secret key 14 to decrypt the document.

It is often useful to verify if a document has not been altered during transmission, or to verify who sent or received a given document. Hashing algorithms (or message digests) and public key technologies facilitate solutions to document integrity and transport verification.

Digital certificates can also be used to provide enhanced security for encrypted information. Suppose a recipient owns a public/private key pair and wishes to publish the public key 32 so others can use the public key 32, either to encrypt information to be sent to the recipient, or to verify the digital signature of the recipient. A secure technique for the recipient to publish the public key 32 is to register the public key 32 with a trusted authority. The trusted authority can then certify that a particular public key 32 belongs to the recipient. A digital certificate connects a recipient, or other entity, with a particular public key 32.

A digital certificate, as disclosed later, is a record of a public key and an identity, and the association of the two as attested to by a third party by means of a digital signature. The private key is not in the certificate, but only one private key can match a given public key. A public/private key pair is actually a pair of numbers with the following properties:

The private key cannot be derived easily from the public key; and

The public key can be used to cipher data which can only be deciphered by knowing the private key (some public keys algorithms, such as RSA, also have the inverse property, which makes them suitable for use a digital signatures).

A trusted or certificate authority issues and maintains digital certificates.

The disclosed prior art systems and methodologies thus provide some methods for the encryption and secure delivery of documents, but fail to provide a simple digital certificate generation and enrollment system that is implemented and controlled by a sender. The development of such a digital certificate system would constitute a major technological advance.

SUMMARY OF THE INVENTION

A sender driven certificate enrollment system and methods of its use are provided, in which a sender controls the generation of a digital certificate, which can be used to encrypt and send a document to a recipient in a secure manner. The sender compares previously stored recipient information to gathered information from the recipient. If the information matches, the sender transfers key generation software to the recipient, which produces the digital certificate, comprising a public and private key pair. The sender can then use the public key to encrypt and send the document to the recipient, wherein the recipient can use the matching private key to decrypt the document. In a preferred embodiment, a server is interposed between the sender and the recipient, to provide increased levels of system security, automation, and integrity.

DETAILED DESCRIPTION OF PREFERRED EMBODIMENTS

The sender driven certificate enrollment system (SDCE) 42 enables corporations, publishers and individuals to securely distribute documents electronically, by allowing the sender to initiate and control the implementation of digital certificate enrollment to one or more recipient clients.

Figure 5:
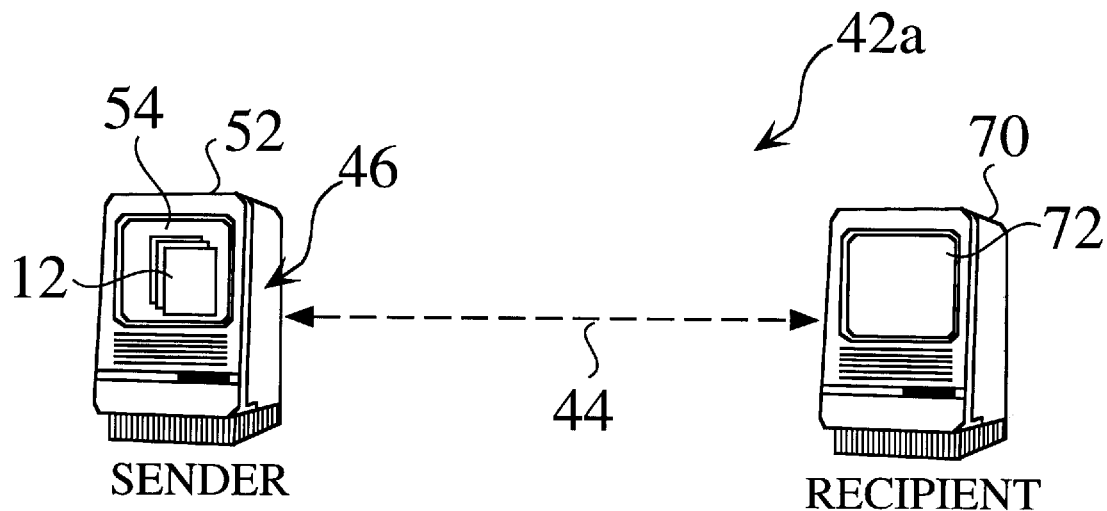
FIG. 5 shows a basic certificate enrollment system implemented between a sending computer and a receiving computer across a network.
Figure 6:
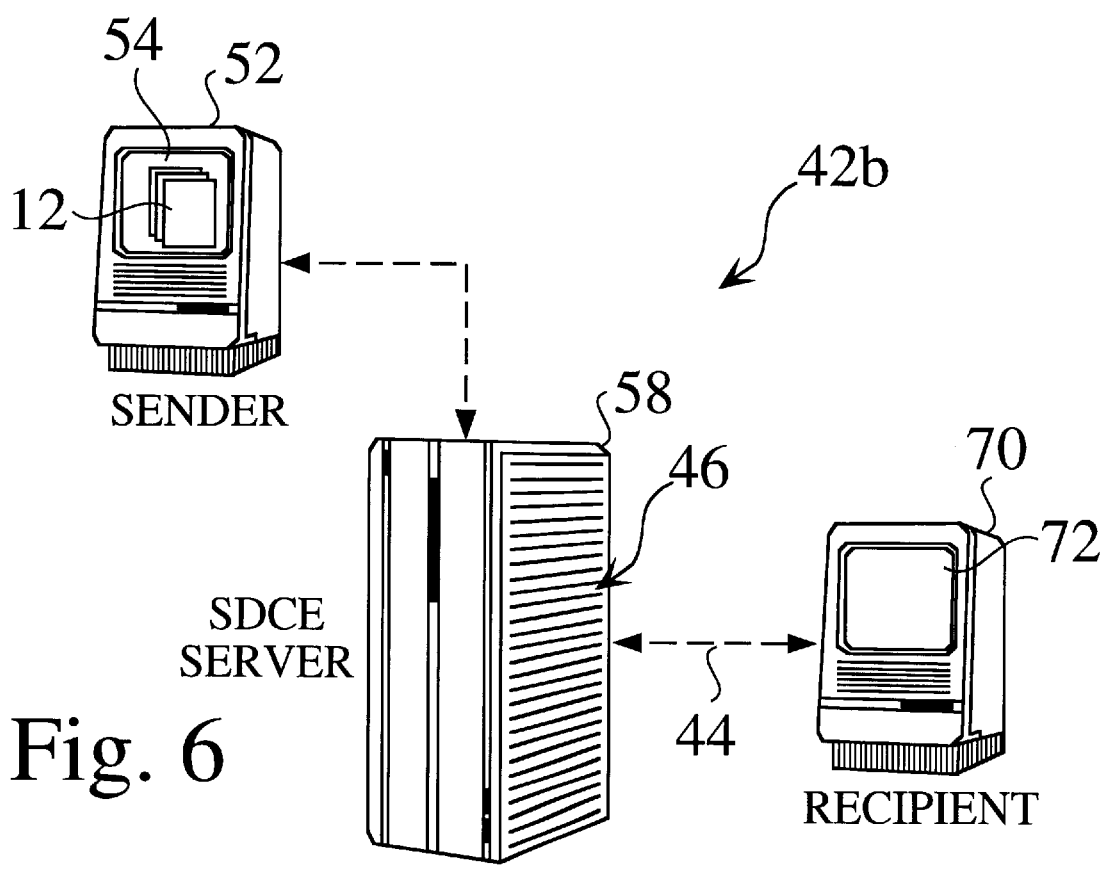
FIG. 6 shows a certificate enrollment system implemented between a sending computer, a SDCE server and a receiving computer.
Figure 7:
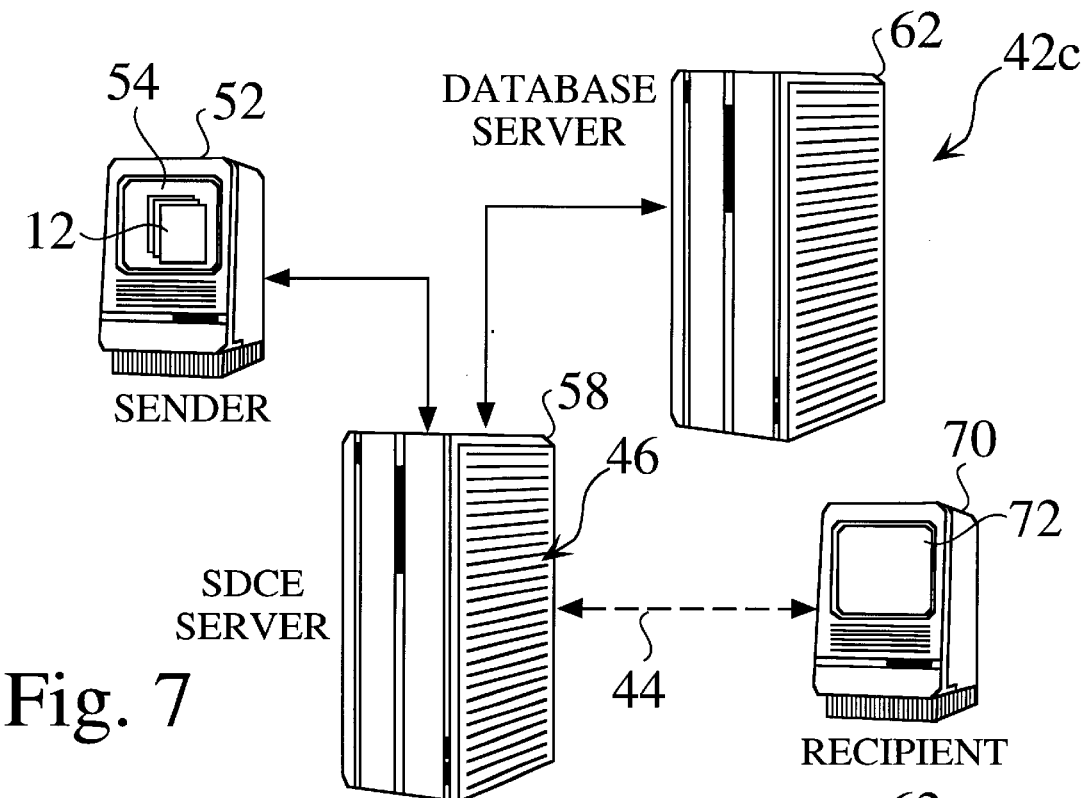
FIG. 7 shows a certificate enrollment system implemented between a sending computer, a SDCE server, a database server and a receiving computer.
Figure 8:
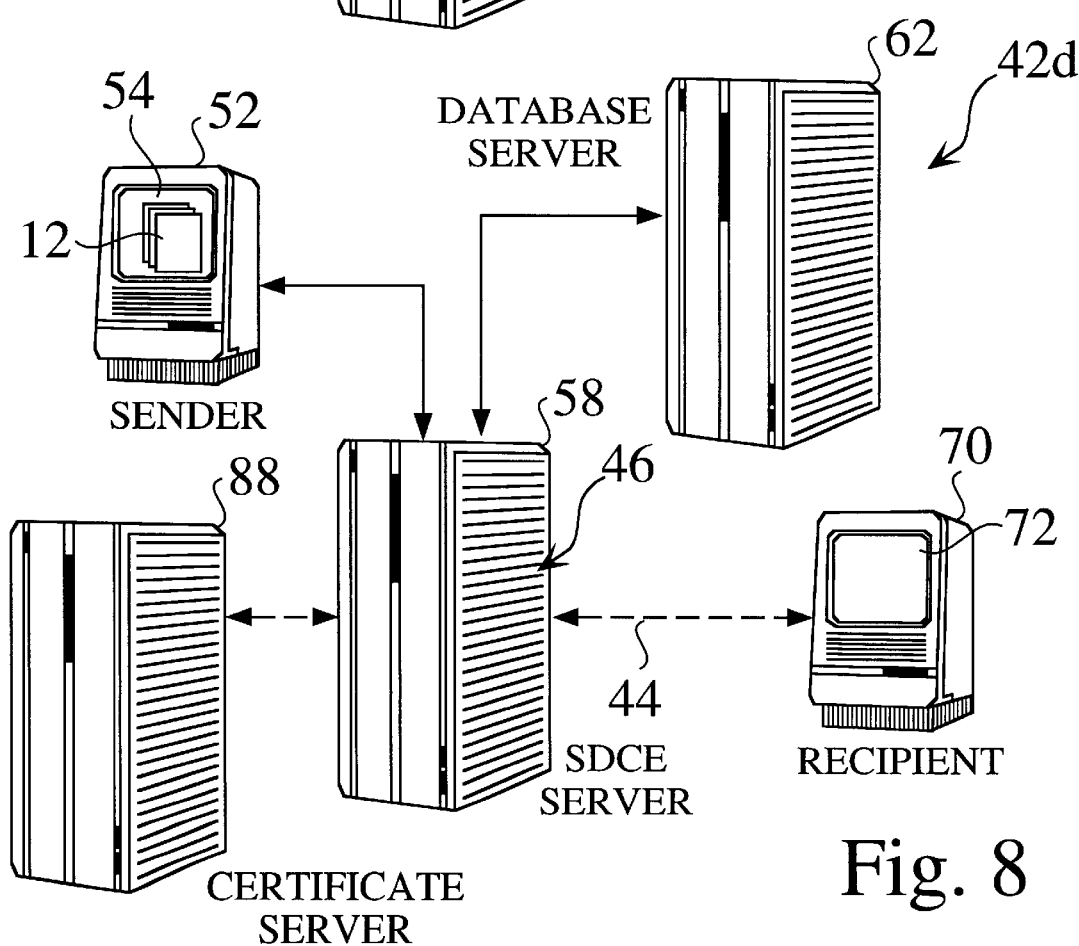
FIG. 8 shows a certificate enrollment system implemented between a sending computer, a SDCE server, a database server, a certificate server and a receiving computer.

FIG. 5 shows a basic certificate enrollment system 42a implemented between a sending computer 52 and a receiving computer 70 across a network 44, which may include an internet. FIG. 6 shows a certificate enrollment system 42b implemented between a sending computer 52, a SDCE server 58 and a receiving computer 70. FIG. 7 shows a certificate enrollment system 42c implemented between a sending computer 52, a SDCE server 58, a database server 62 and a receiving computer 70. FIG. 8 shows a certificate enrollment system 42d implemented between a sending computer 52, a SDCE server 58, a database server 62, a certificate server 88 and a receiving computer 70.

Figure 9:
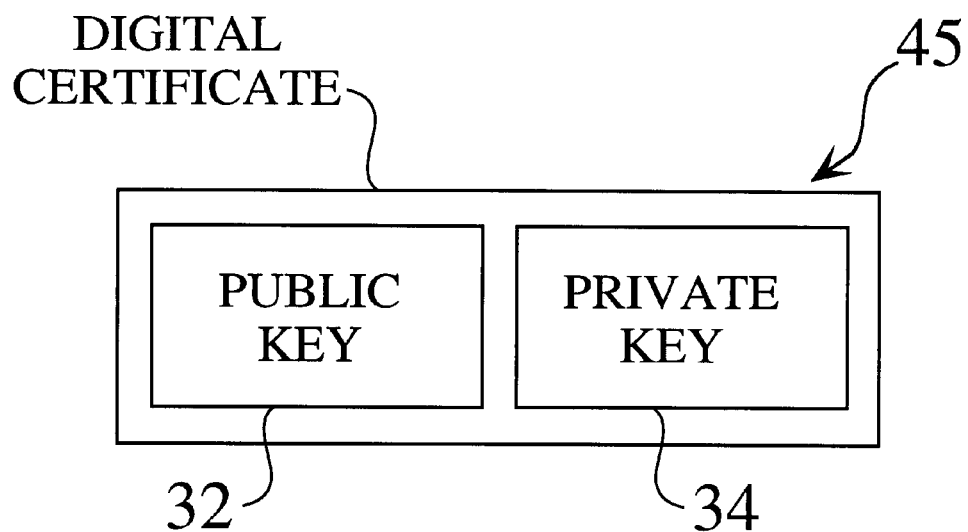
FIG. 9 is a block diagram of a digital certificate.

The sender driven certificate enrollment system 42 enables the sender 52 of a document 12 to initiate the generation of a digital certificate 45, on behalf of an intended recipient 70 of a document. A document 12 can mean a specific computer file or more generally any discrete collection of data. The sender driven certificate enrollment system 42 simplifies the associated complexity of generating a digital certificate for an intended recipient 70 of a document, and transfers the primary burden of certificate generation from the recipient 70 (which many systems support today) to the sender 52. FIG. 9 shows a digital certificate 45, which denotes a key pair comprising a public 32 and private key 40, where the public key 32 is associated with a specific entity, such as an intended recipient 70, and is published.

One of the main problems associated with secure document delivery stems from the challenge of encrypting a document 12 with the public key 32 of the intended recipient 70. In particular, the intended recipient 70 of a document may not have a digital certificate 45. In the absence of a digital certificate 45 of the recipient 70 which is accessible by the sender 52, the sender 52 of a document 12 cannot encrypt the document 12 with the recipient's public key 32, and hence cannot be assured that the document 12 can be protected from unsolicited access. The sender driven certificate enrollment system 42 allows the sender 52 of a document 12 to initiate the process of dynamically generating a digital certificate 45 for the intended recipient 70, thereby imposing minimum requirements for the intended recipient 70.

The sender driven certificate enrollment system 42 transfers the burden of certificate generation from the recipient 70 of a given document 12 to the sender 52. The sender driven certificate enrollment system 42 exploits the fact that, in the context of document delivery, often the sender 52 of a document 12 has unique and specific information regarding the intended recipient 70. Suppose, for example, an attorney sends a document to a client 70. The attorney 52 likely has a record associated with the client 70 which contains specific information, such as the client's e-mail address, physical address, telephone number. The client record may also contain confidential information, such as the client's social security number, drivers license number, or even credit information.

Typically, it is this type of confidential information which is utilized to authenticate a given individual or entity 70, and hence generate a digital certificate 45. Highly confidential and specific information yields a high level of authentication, and hence a secure digital certificate.

Therefore, the sender driven enrollment system 42 exploits the fact that the sender 52 often knows significant and confidential information regarding an intended 25 recipient 70 of a document 12. The use of this confidential information by the sender 52 to generate a digital certificate 45 minimizes the burden imposed on the recipient 70 to confirm their identity. The digital certificate 45 is then utilized by the sender 52 to securely send the document 12 to the intended recipient 70.

System Implementation. In the example above, a sender attorney 52 wishes to send a confidential document to an intended recipient client 70. For a client 70 that does not currently have a digital certificate 45 accessible to the attorney 52, the attorney 52 can invoke the sender driven enrollment system 42 to generate a digital certificate 45 for the client 70.

First, the sender driven enrollment system 42 checks or queries a database 46 to determine if a digital certificate 45 exists for the recipient client 70. If not, the sender driven enrollment system 42 conducts a database query to pull up a record for the client 70, which typically includes client specific and confidential information.

Figure 10:
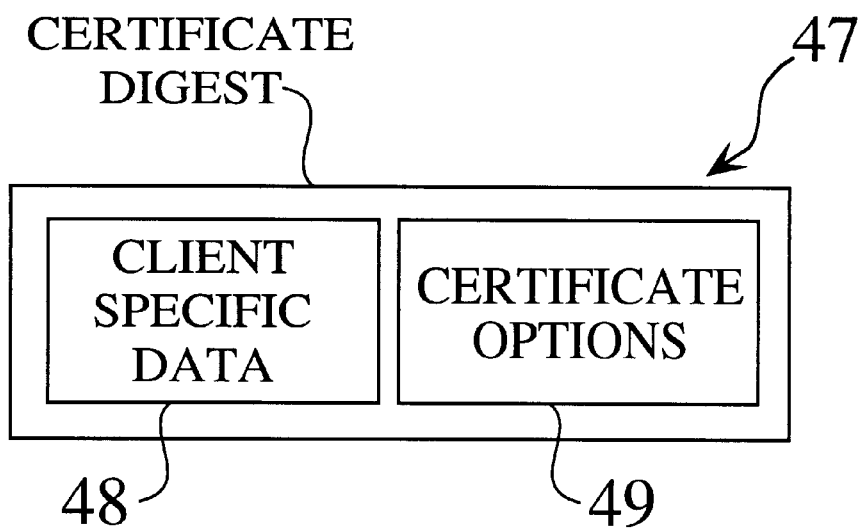
FIG. 10 is a block diagram of a certificate digest.

The sender driven certificate enrollment system 42 then generates a certificate digest 47, as shown in FIG. 10. This certificate digest 47 contains most of the information necessary to generate a digital certificate 45 for the client 70, including the client specific data 48, and the type of certificate to generate 49 (e.g. an X.509 certificate). In a preferred embodiment, the certificate digest 47 is forwarded to a secure SDCE server 58. The SDCE server 58 then "contacts" the client 70, seeking independent confirmation of the confidential information 48. For example, in a preferred embodiment of the invention, the SDCE server 58 forwards an e-mail message to the client 70 with a unique, dynamically generated URL (uniform resource locator). The client 70 can then "click" or access this URL through a standard web browser. Accessing the URL begins a direct interaction, or SDCE conversation 68, between the client 70 and the SDCE server 58.

The client 70 is typically asked to input one or more pieces of confidential information 58 to the SDCE server 58. In a preferred embodiment, the conversation takes place over a secure socket layer (SSL) channel between client 70 and the SDCE server 58, and utilizes HTML forms.

The SDCE server 58 then attest whether the client 70 is correct, by comparing input information to the stored client information 48 within the stored certificate digest 47. On a match, the SDCE server 58 forwards the certificate digest 47 over a secure channel to the recipient client's desktop 72, and also distributes software to the recipient client 70, which uses the certificate digest 47 to generate a key pair 32, 40 on the recipient system. In the preferred embodiment of the invention, this software is simply a Java applet, transparently forwarded to the recipient 70 through the browser. The generated private key 32 is stored on the recipient system 70, preferably using the PKCS12 format. The public key 32 is forwarded back to the SDCE server 58, which typically registers both the public and client information as the digital certificate 45 on a certificate server 88, such as an LDAP or an Entrust certificate management server (of Entrust, Inc., Ottawa, Canada).

The sender (e.g. the attorney) 52, can now access the stored public key 32 for the intended recipient client 70, encrypt the document 12 intended for the recipient client 70 with the public key 32, and then send the encrypted document 36 to the client 70. The client 70, in turn, decrypts 38 the encrypted document 36 with [the public key and] the corresponding private key 40, which is now resident on the private recipient system 70.

Figure 11:
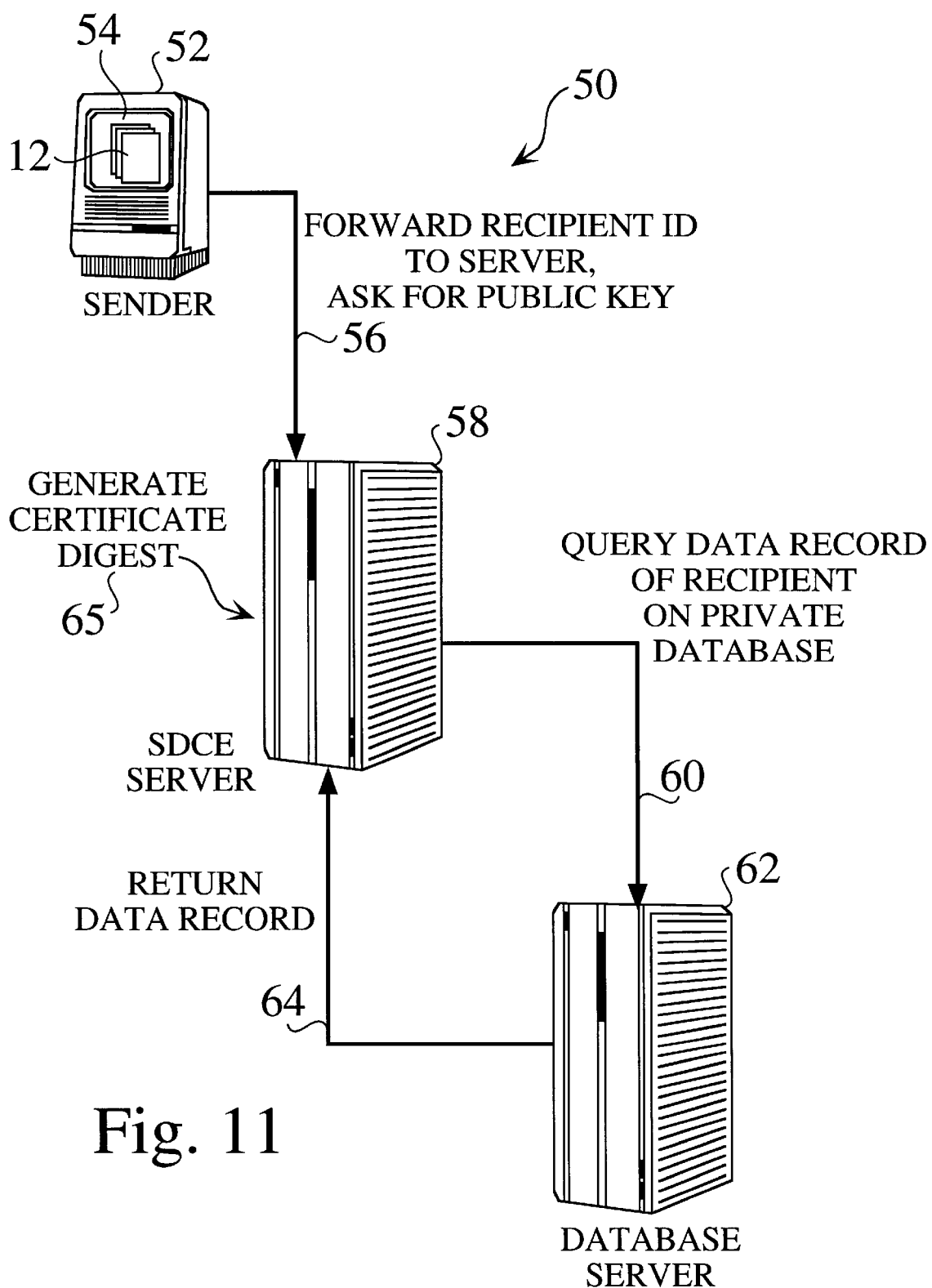
FIG. 11 shows the first stage of operation for the sender driven certificate enrollment system.

FIG. 11 shows the first stage 50 of the sender driven certificate enrollment system 42. A sender 52 initiates the generation of a certificate for a recipient 70 at step 56, by contacting an SDCE server 58 and forwarding basic information to identify the recipient 70, such as an e-mail address.

The SDCE server 58 then queries a database 46, at step 60, for confidential information 48 specific to an intended recipient 70, such as a social security or personal address. The database 46 may reside at any of a number of locations, such as within a separate database server 62, or within the SDCE server 58.

If usable confidential information 48 exists for an intended recipient 70, it is transferred, at step 64, as a data record to the SDCE server 58. The SDCE server 58 then uses the data record to generate a certificate digest 47, at step 65, which is later used to attest the recipient 70 and to generate a digital certificate 45.

Figure 12:
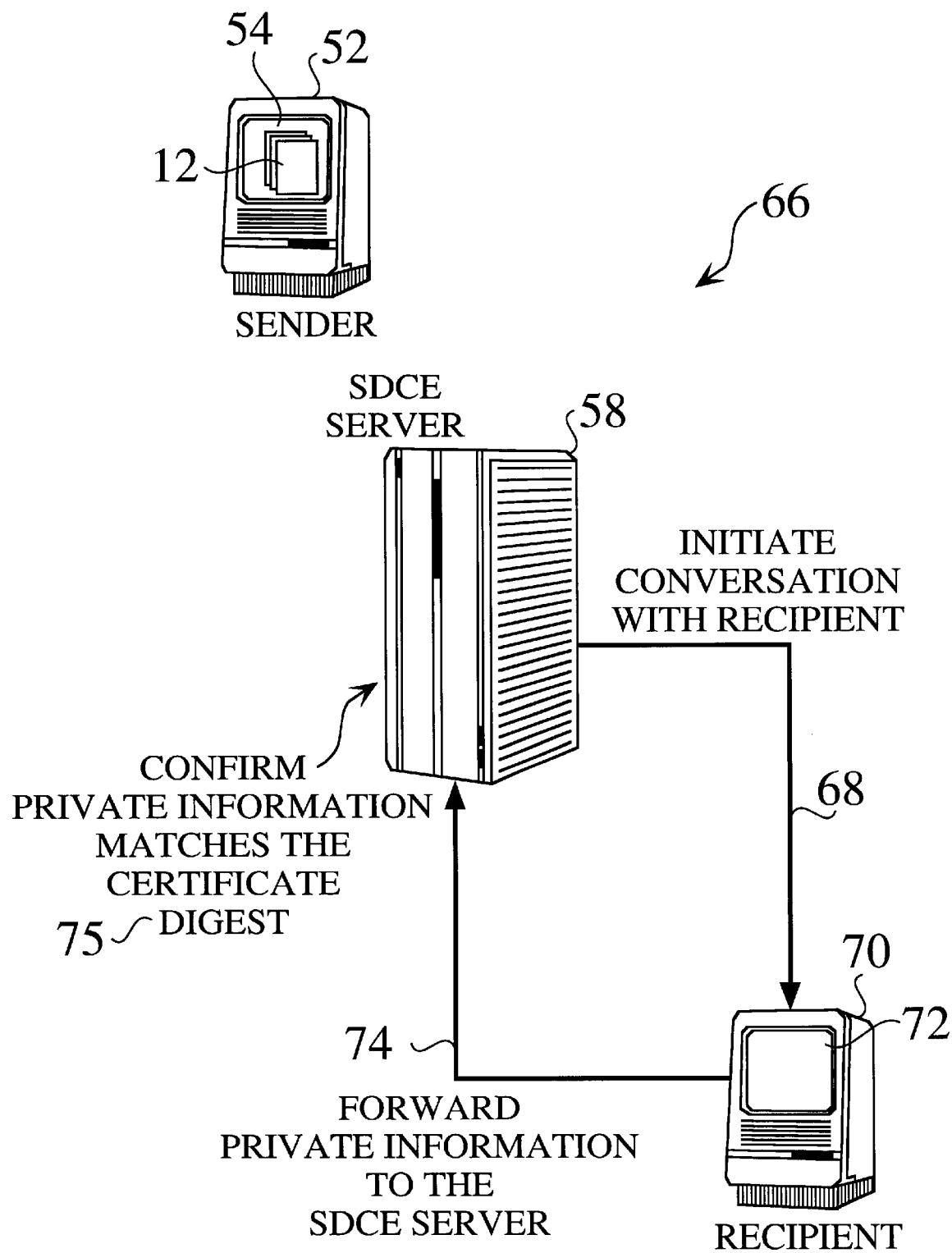
FIG. 12 shows the second, attestation conversation stage of the sender driven certificate enrollment system.

FIG. 12 shows the second stage 66 of the sender driven certificate enrollment system 42, referred to as an attestation conversation. The SDCE server 58 takes the certificate digest 47 and initiates a direct interaction, at step 68, with the intended recipient 70 of a document 12. This direct interaction 68 solicits client specific data 48 from the intended recipient 70.

In a preferred embodiment of the invention, the SDCE server 58 sends an e-mail message with a dynamically generated Uniform Resource Locator (URL). The recipient 70, by clicking on the generated URL, invokes a direct interaction 68 with the SDCE server 58. At this point, the SDCE server 58 presents HTML forms soliciting specific information from the recipient 70.

The HTML forms and requested private information 48 may vary, depending on the level of security desired for the document 12 to be sent to the recipient 70. For example, for a document that does not require a high level of security, the forms might simply request a confirm button. For a document that requires a higher level of security, the form might ask the intended recipient 70 to submit specific private information 48, such as a personal address, a social security number, and employee number or personal identification number (PIN). In a preferred embodiment of the invention, this interaction between the SDCE server 58 and the recipient 70 takes place over a secure channel using SSL.

Figure 15:
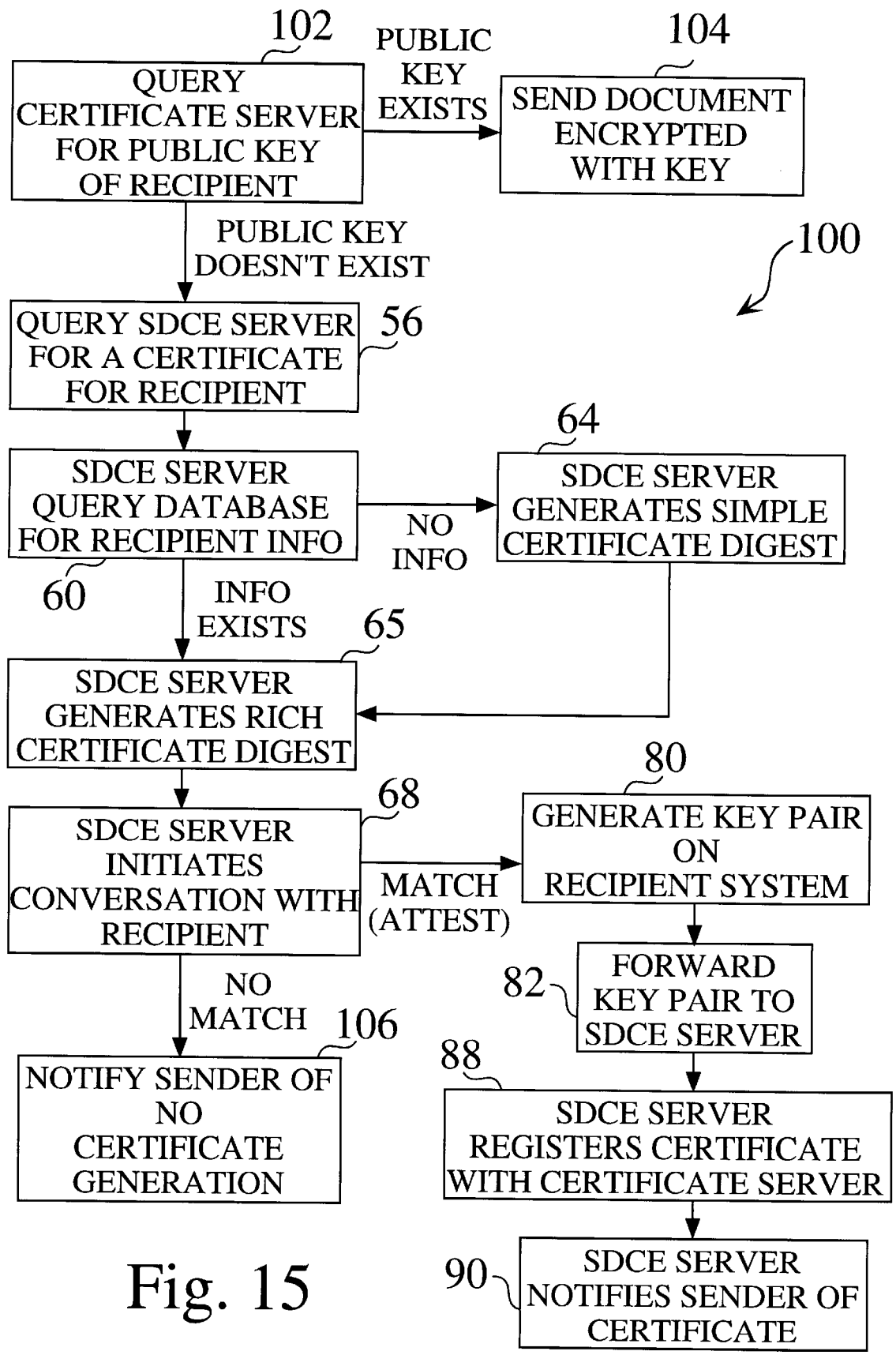
FIG. 15 is flow chart that shows the basic decision tree for the sender driven certificate enrollment system.

Using the forwarded private information 48, through step 74, the SDCE server then attests the recipient 70 by comparing the forwarded data 48 to the certificate digest 47 for the intended recipient 70. If the forwarded information 74 and the appropriate stored information 48 in the certificate digest 47 match, the recipient 70 is authenticated, at step 75, and the process continues to the next stage. If the forwarded 74 information and the appropriate stored information 48 in the certificate digest 47 do not match, the sender 52 is notified that no digital certificate 45 has been generated (FIG. 15).

Figure 13:
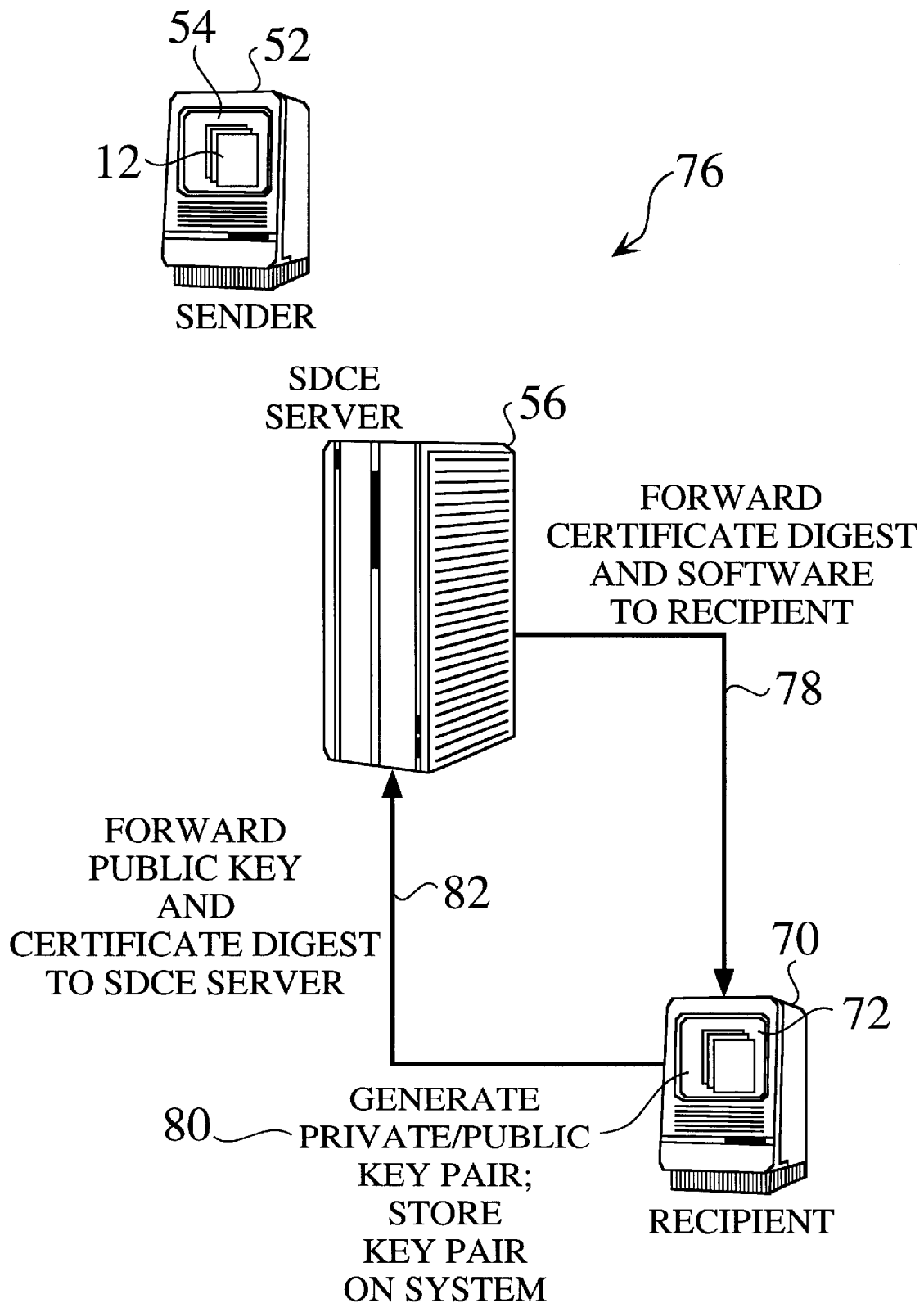
FIG. 13 shows the third, public/private key pair generation stage of the sender driven certificate enrollment system.

FIG. 13 shows the third stage 76 of the sender driven certificate enrollment system 42, referred to as public/private key pair generation. Assuming that the private information 74 solicited over the attestation conversation stage 66 matches the certificate digest 47 at the SDCE Server 58, the SDCE server 58 then forwards software and the certificate digest 47 to the recipient system 70, at step 78. The forwarded software utilizes the certificate digest 47, and information local to the recipient computer 70, to generate a digital certificate 45, comprising private/public key pair 32, 40. The key pair 32, 40 is sent to and stored locally on the sender system 52. In a preferred embodiment, the public/private key pair 32, 40 is stored in a PKCS12 format. The public key 32 and a reference to the certificate digest 47 for the recipient 70 is then forwarded from the receiver 70 to the SDCE server 58.

Figure 1:
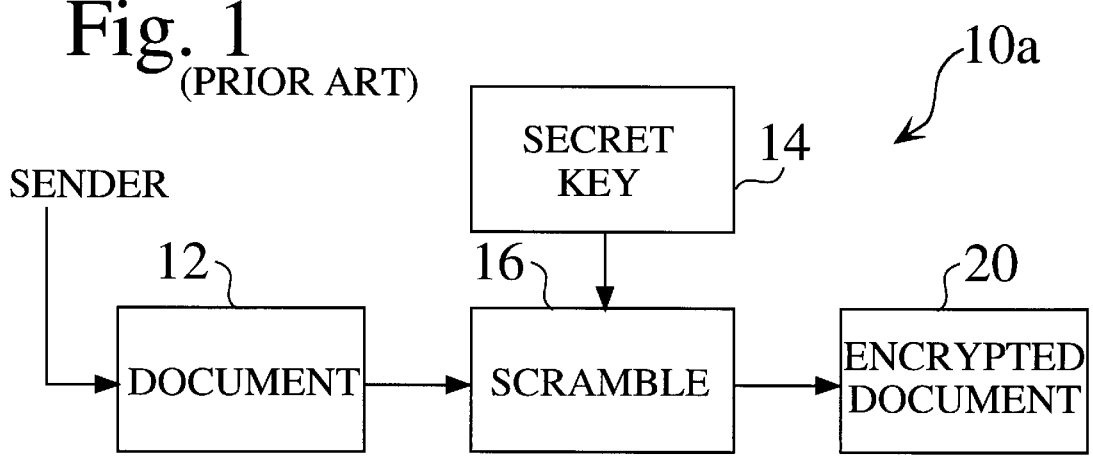
FIG. 1 is a block diagram of secret key encryption of a document.
Figure 2:
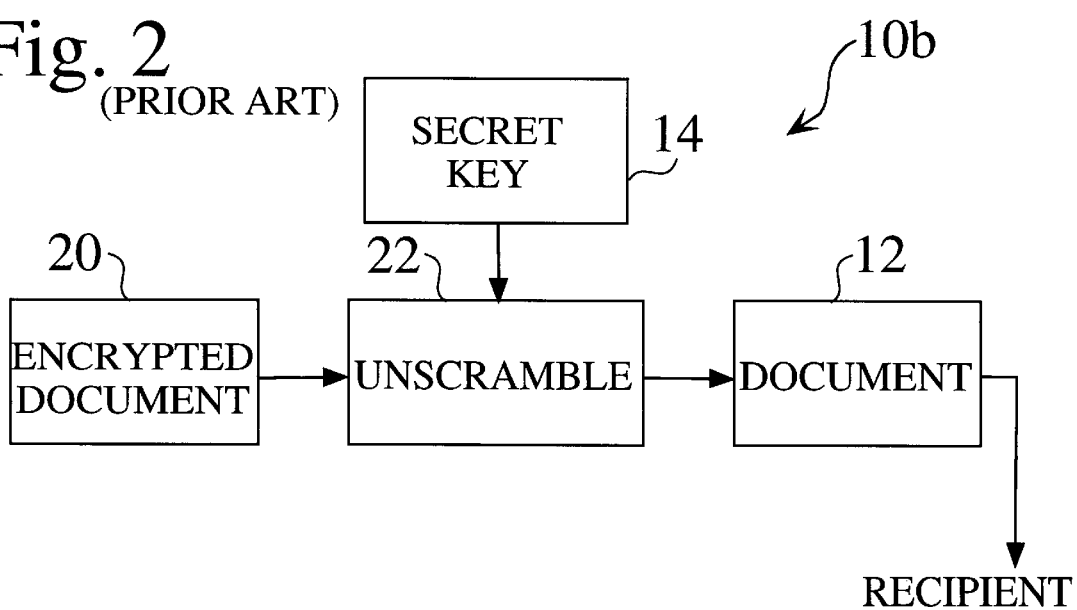
FIG. 2 is a block diagram of secret key decryption of a document.
Figure 3:
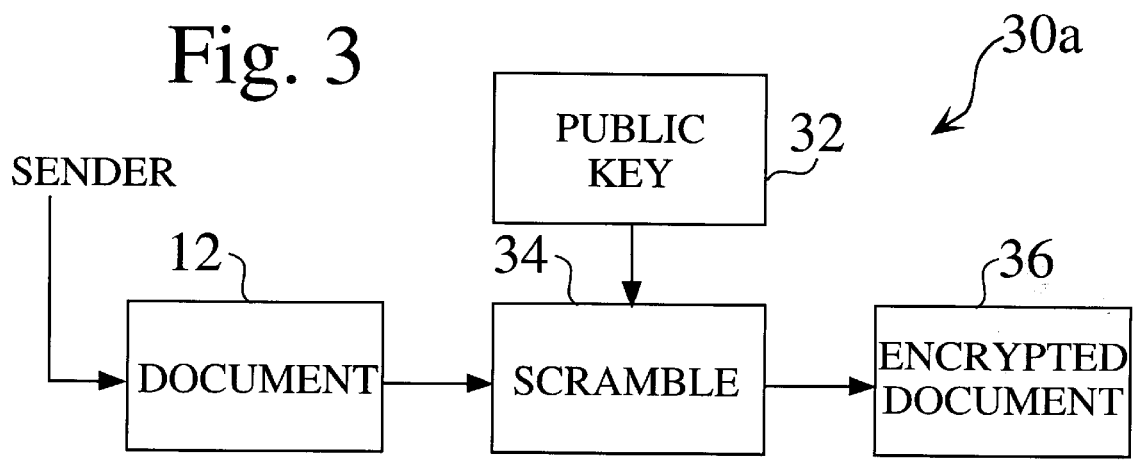
FIG. 3 is a block diagram of public key encryption of a document.
Figure 4:
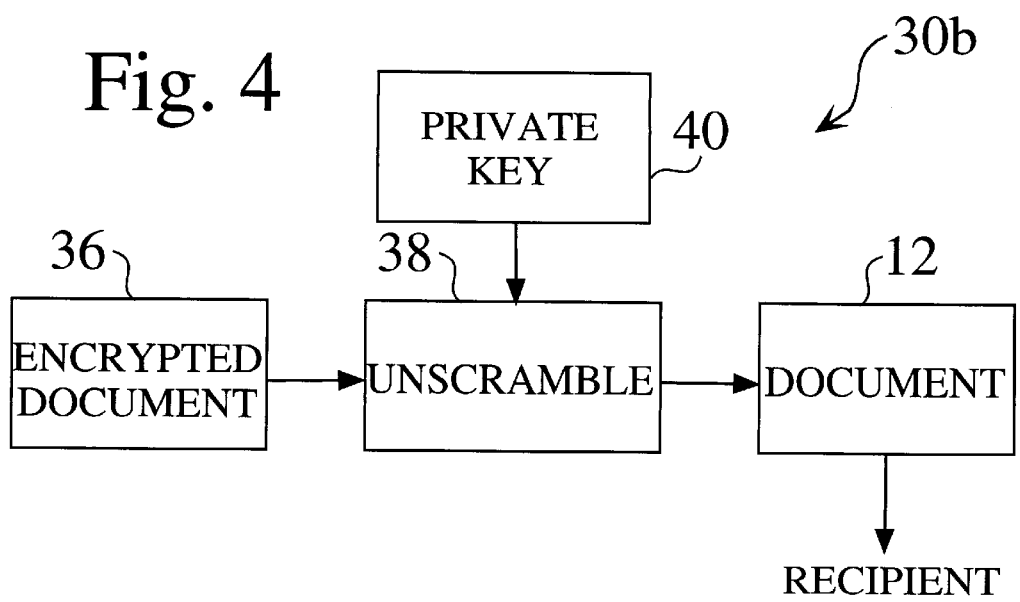
FIG. 4 is a block diagram of private key decryption of a document.
Figure 14:
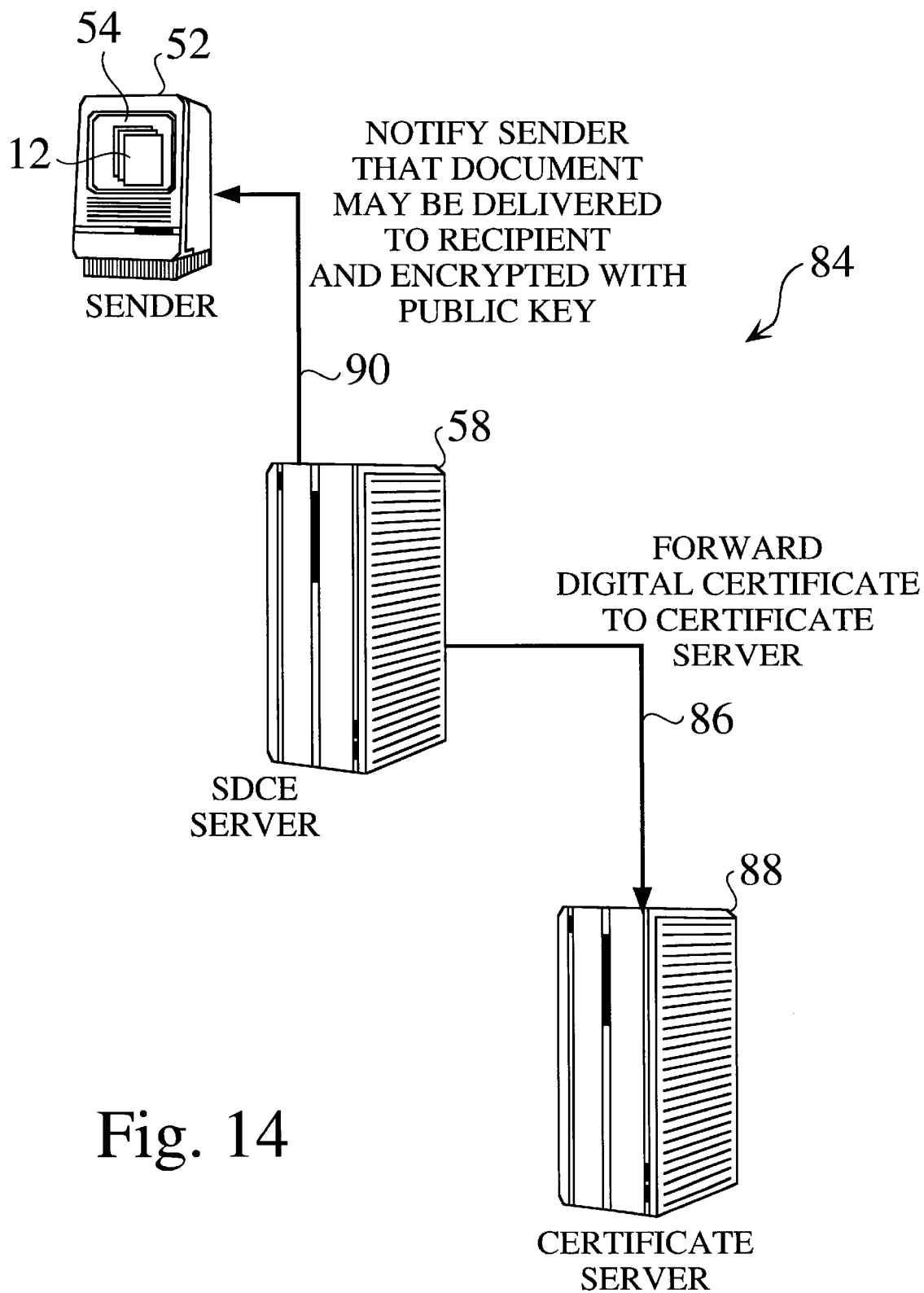
FIG. 14 shows the fourth stage of the sender driven certificate enrollment system, referred to as forwarding and registration of the receiver public key.

FIG. 14 shows the fourth stage 84 of the sender driven certificate enrollment system 42, referred to as forwarding and registration of the receiver public key 32. At this stage in the process, the public key 32 for the intended recipient 70 has been forwarded from the recipient system 70 to the SDCE server 58. The SDCE server 58 forwards the public key 32 and the certificate digest 47, combined as a digital certificate 45, to a certificate server 88, at step 86. In a preferred embodiment, the certificate server 88 is an LDAP (Lightweight Directory Access Protocol) server. The SDCE server 58 then sends a notification back to the sender 52, at step 90, that indicates that the document 12 can now be encrypted 34 with the public key 32 of the recipient 70, as shown in FIG. 3. The encrypted document 36 is then delivered to the recipient 70, typically across a network or internet architecture 44. The recipient 70 then uses their own private key 40 to decrypt the information, as shown in FIG. 4.

Implementation. This section provides an overview of the components to construct a sender driven certificate enrollment system 42. Some of the components, such as the certificate server 88 do not require any customization or development. FIG. 15 is a basic flow chart that describes the flow of control for the system.

Sender Desktop Client Software. On the desktop 54 of the sender computer 52, the sender driven certificate enrollment system 42 includes software which communicates with the SDCE server 58 and the certificate server 88 to query the public key 32 associated with the recipient 70. The recipient software component, upon retrieval of the public key 32 for the recipient 70, typically encrypts a document 12 with the public key 32 and then forwards the document to the SDCE server 58 for subsequent delivery to the recipient 70.

SDCE Server Software. The SDCE Server software, in a preferred embodiment of the invention, includes a HTTP Web Server with a customized filter to intercept and redirect all HTTP requests, a e-mail server to forward notifications on to an intended recipient 70, and the basic software and logic to query a database server, to generate a certificate digest 47 (as described above), and to interact with all other components of the system.

The Web server is a primary interface between the SDCE server 58 and the intended recipient 70 of a document 12, in which the SDCE server 58 assists in the construction of a digital certificate 45.

In a preferred embodiment of the invention, the SDCE server software initiates an attestation conversation 66 (FIG. 12) with the intended recipient 70, by dynamically generating a private URL. The private URL contains a key to uniquely identify the recipient 70, and then forwards this "key" to the recipient over a standard e-mail notification. When the recipient 70 accesses this "key" (which in fact is a private URL), the SDCE server 58 associates the key with a given certificate digest 47, and then through the Web interface, conducts the attestation conversation 66, to verify that the given recipient 70 matches the parameters of the certificate digest 47.

Recipient Client Software. The sender driven certificate enrollment system 42 creates a public/private key pair from a certificate digest 47, which is forwarded from the SDCE server 58 to the recipient system 70. Client software on the recipient computer takes the certificate digest 47, constructs the public/private key pair 32, 40 on the recipient desktop 72, stores these keys 32, 40 on the recipient system 70, and then forwards the public key 32 to the SDCE server 58.

In a preferred embodiment, the recipient client software is a Java applet, which is transparently and dynamically downloaded via a web browser, in which the recipient simply accesses an URL, as described above.

Certificate Server. The invention makes use of basic digital certificate management. The certificate server 88 includes query ability, which determines if a digital certificate exists for a recipient given a specific user profile (e.g. a e-mail address and identifier). The certificate server 88 also includes update ability, which allows a programmatic interface to add a new certificate to the server's database.

In preferred embodiments, LDAP, X.500, or proprietary certificate servers such as a Entrust server can be used as certificate servers 88.

Database Server. In a preferred embodiment of the invention, the SDCE server 58 queries a database 46 containing recipient information to construct a certificate digest 47. In a basic embodiment, the sender's desktop 54 can query an internal database 46, or the sender's desktop 54 can simply load information directly from the desktop 54. The preferred database query provided by a SDCE server 58 supports more scalability and extensibility.

In addition to the basic design for the invention, there remains situations wherein no recipient data 48 exists which is readily accessible from the senders system 52, either directly from the desktop 54 or via a database query. In this case, the sender driven enrollment system 42 still retains value. While the certificate digest 47 contains limited information 48, the level of attestation is also limited. However, basic attestation can still take place, and the system 42 still simplifies the process of generating a basic digital certificate 45 for the recipient 70. In this case, the system behaves exactly as designed, with the exception being a more simplistic conversation 66 and certificate digest 47.

FIG. 15 is flow chart 100 that describes the basic decision tree behind the sender driven certificate enrollment system 42.

At step 102, the sender 52 queries the certificate server 88 for the public key 32 of an intended recipient 70 for a document 12. If the public key 32 exists, the document 12 is encrypted with the public key 32, and is sent to the recipient 70, at step 104. If the public key 32 doesn't exist, the sender queries the SDCE Server 58 for a certificate digest 47 for the intended recipient 70, at step 56.

The SDCE server 58 then queries the database 46 for information 48 regarding the intended recipient 70, at step 60. If the information exists and is already stored in the database 46, the SDCE server 58 generates a rich certificate digest for the client 70, at step 65. If no information 48 exists and is stored in the database 46, the SDCE server 58 generates a simplified certificate digest 47, at step 64.

At step 68, the SDCE server 58 initiates an attestation conversation 66 with the recipient 70. If there is no match to the information 48, the SDCE server 58 notifies the sender 52, at step 106, and there is no generation of a key pair 32, 40. If there is a match, a private/public key pair 32, 40 for the recipient 70 is generated on the recipient system 70, at step 80. The key pair is then forwarded to the SDCE server 58, at step 82. At step 88, the SDCE server registers the certificate for the intended recipient 70 with a certificate server 88. At step 90, the SDCE server notifies the sender 52 of the digital certificate 45. The sender 52 can then encrypt the document 12 with the generated public key 32 of the intended recipient 70, as shown in FIG. 3. When the encrypted document 36 is sent to the recipient 70, typically over a network 44, the recipient 70 can decrypt the encrypted document 36, using the stored private key 40, as shown in FIG. 4.

CONCLUSION

Although the sender driven certificate enrollment system and its methods of use are described herein in connection with use in the Internet, the invention may be applied to any of a wide variety of networks, including internets, intranets, LANs and WANs, or any combination thereof, as desired. As well, the invention may be applied. to a wide variety of computer platforms, servers, communication protocols, cryptography protocols, or any combination thereof, as desired.

Although the present invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:

1. An apparatus for generating a digital certificate for a recipient by a sender, comprising:
   a sending computer for use by said sender;
   a receiving computer for use by said recipient;
   a database for storing recipient information;
   means for initiating certificate enrollment in response to a request for a public key by the sending computer;
   means for querying said database by said sender for said stored recipient information;
   means for gathering private recipient information from said recipient;
   means for comparing said gathered private recipient information and said stored recipient information;
   means for controllably generating a digital certificate comprising a public key and a private key at said receiving computer;
   means for storing said digital certificate; and
   means for transferring said public key to said sending computer.

2. The apparatus of claim 1, further comprising:
   a server interposed between said sending computer and said receiving computer.

3. The apparatus of claim 2, wherein said database for storing recipient information is located on said server.

4. The apparatus of claim 2, wherein said means for querying said database by said sender for said stored recipient information is located on said server.

5. The apparatus of claim 2, wherein said means for gathering private recipient information from said recipient is located on said server.

6. The apparatus of claim 2, wherein said means for comparing said gathered private recipient information and said stored recipient information is located on said server.

7. The apparatus of claim 2, wherein said means for storing said digital certificate is located on said server.

8. The apparatus of claim 1, further comprising:
   a certificate digest comprising said stored recipient information and sender selectable options for said digital certificate.

9. The apparatus of claim 1, wherein said means for gathering private recipient information from said recipient includes an e-mail message to said recipient.

10. The apparatus of claim 9, wherein said e-mail message to said recipient contains an URL reference.

11. The apparatus of claim 1, wherein said means for gathering private recipient information takes place over a secure socket layer channel.

12. The apparatus of claim 1, wherein said means for gathering private recipient information includes HTML forms to be filled by said recipient.

13. The apparatus of claim 1, wherein said means for controllably generating a digital certificate is a Java applet™.

14. The apparatus of claim 1, wherein said digital certificate is stored using a PKCS12 format.

15. A method of generating a digital certificate for a recipient by a sender, comprising the steps of:
   initiating certificate enrollment in response to a request for a public key by the sender;
   querying a database for stored recipient information;
   gathering information from said recipient; comparing said gathered information with said queried, stored recipient information;
   selectively transferring software to said recipient based upon said comparison;
   selectively generating said digital certificate at said recipient with said software, said digital certificate comprising a public key and a private key; and
   transferring a copy of said public key to said sender.

16. The method of claim 15, further comprising the step of:
   transferring a copy of said public key to said sender.

17. The method of claim 15, wherein said database for storing recipient information is located on a server.

18. The method of claim 15, wherein said step of querying said database is performed by a server.

19. The method of claim 15, wherein said step of gathering information from said recipient is performed by a server.

20. The method of claim 15, wherein said step of comparing said gathered information with said queried, stored recipient information is performed by a server.

21. The method of claim 15, further comprising the step of:
   generating a certificate digest comprising said stored recipient information and sender selectable options for said digital certificate.

22. The method of claim 15, wherein said step of gathering information from said recipient includes an e-mail message to said recipient.

23. The method of claim 23, wherein said e-mail message to said recipient contains an URL reference.

24. The method of claim 15, wherein said step of gathering information from said recipient takes place over a secure socket layer channel.

25. The method of claim 15, wherein said step of gathering information from said recipient uses HTML forms to be filled by said recipient.

26. The method of claim 15, wherein said software is a Java applet™.

27. The method of claim 15, wherein said digital certificate is stored using a PKCS12 format.

28. An apparatus for controlling generating a digital certificate for a recipient by a sender, comprising:
   a sending computer for use by said sender;
   a receiving computer for use by said recipient;
   a database for storing recipient information;
   means for initiating certificate enrollment in response to a request for a public key by the sending computer;
   means for gathering information from said recipient; and
   means for controllably generating a digital certificate for said recipient if said gathered information and said stored recipient information match.

29. The apparatus of claim 28, further comprising:
   a server interposed between said sending computer and said receiving computer.

30. The apparatus of claim 29, wherein said database for storing recipient information is located on said server.

31. The apparatus of claim 29, wherein said means for gathering information from said recipient is located on said server.

32. The apparatus of claim 29, wherein said means for controllably generating a digital certificate is located on said server.

33. The apparatus of claim 29, wherein said means for controllably generating a digital certificate includes software that is downloadable from said server to said receiving computer.

34. The apparatus of claim 29, wherein said server includes means for storing said digital certificate.

35. The apparatus of claim 28, further comprising:
   a certificate digest comprising said stored recipient information and sender selectable options for said digital certificate.

36. The apparatus of claim 28, wherein said means for gathering information from said recipient includes an e-mail message to said recipient.

37. The apparatus of claim 36, wherein said e-mail message to said recipient contains an URL reference.

38. The apparatus of claim 28, wherein said means for gathering information from said recipient takes place over a secure socket layer channel.

39. The apparatus of claim 28, wherein said means for gathering information from said recipient includes HTML forms to be filled by said recipient.

40. The apparatus of claim 28, wherein said means for controllably generating a digital certificate is a Java applet™.

41. The apparatus of claim 28, wherein said digital certificate is stored using a PKCS12 format.

* * * * *